(12) United States Patent
Maccari

(10) Patent No.: US 9,367,772 B2
(45) Date of Patent: Jun. 14, 2016

(54) CONTROLLING METHOD FOR COLOR CALIBRATION TARGET TO BE USED DURING DIGITAL PRINTING PROCESS INVOLVES PROCESSING MEASUREMENT OF COLORED ZONES FOR OBTAINING DESCRIBER OF CALIBRATION TARGET IF NO PRINT ANOMALIES ARE PRESENT

(76) Inventor: Antonio Maccari, Pisa (IT)

( * ) Notice: Subject to any disclaimer, the term of this patent is extended or adjusted under 35 U.S.C. 154(b) by 0 days.

(21) Appl. No.: 14/342,825

(22) PCT Filed: Sep. 14, 2012

(86) PCT No.: PCT/IB2012/054792
§ 371 (c)(1),
(2), (4) Date: Mar. 5, 2014

(87) PCT Pub. No.: WO2013/038370
PCT Pub. Date: Mar. 21, 2013

(65) Prior Publication Data
US 2014/0192373 A1  Jul. 10, 2014

(30) Foreign Application Priority Data

Sep. 14, 2011 (IT) .............................. MO2011A0229

(51) Int. Cl.
| G06K 1/00 | (2006.01) |
| G06K 15/02 | (2006.01) |
| H04N 1/407 | (2006.01) |
| H04N 1/60 | (2006.01) |

(52) U.S. Cl.
CPC ............ *G06K 15/027* (2013.01); *H04N 1/4078* (2013.01); *H04N 1/6033* (2013.01)

(58) Field of Classification Search
None
See application file for complete search history.

(56) References Cited

U.S. PATENT DOCUMENTS

| 5,760,913 | A  | * | 6/1998  | Falk .............................. 382/167 |
| 6,391,388 | B1 | * | 5/2002  | Hilgenfeld et al. ........... 427/279 |
| 6,402,823 | B1 |   | 6/2002  | Garcia Sainz et al. |
| 8,317,293 | B2 | * | 11/2012 | Lill et al. ......................... 347/19 |
| 8,559,078 | B2 | * | 10/2013 | Shibuya ......................... 358/505 |
| 2005/0117926 | A1 | * | 6/2005 | Tanaka et al. ................... 399/49 |
| 2007/0024647 | A1 | * | 2/2007 | Cowan et al. ..................... 347/5 |
| 2009/0015616 | A1 |   | 1/2009 | Miyamoto |
| 2009/0034001 | A1 |   | 2/2009 | Shiraishi et al. |
| 2009/0190126 | A1 | * | 7/2009 | Martinez .................... 356/243.5 |
| 2009/0237430 | A1 |   | 9/2009 | Tatsumi |
| 2009/0256877 | A1 |   | 10/2009 | Takahashi et al. |
| 2010/0220365 | A1 |   | 9/2010 | Sasayama |
| 2011/0199626 | A1 |   | 8/2011 | Bestmann |

FOREIGN PATENT DOCUMENTS

| EP | 1272574 A1 | 1/2003 |
| WO | 00/21760 A1 | 4/2000 |
| WO | 2007135544 A2 | 11/2007 |

* cited by examiner

*Primary Examiner* — Steven Kau
(74) *Attorney, Agent, or Firm* — Pearne & Gordon LLP

(57) ABSTRACT

A calibration target is printed by means of a printing device comprising a plurality of groups of printheads. The printheads of each group are fed with ink of the same color. The calibration target includes a plurality of colored zones that are intended to be subsequently processed. The printheads of each group further generate a series of control zones with the same nominal quantity of the corresponding ink. The control zones are free of overlapping between inks applied by different printheads. A parameter of each control zone is measured and the measured values of this parameter are compared to each other in order to assess whether the control zones exhibit print anomalies.

14 Claims, 4 Drawing Sheets

CONTROLLING METHOD FOR COLOR CALIBRATION TARGET TO BE USED DURING DIGITAL PRINTING PROCESS INVOLVES PROCESSING MEASUREMENT OF COLORED ZONES FOR OBTAINING DESCRIBER OF CALIBRATION TARGET IF NO PRINT ANOMALIES ARE PRESENT

The invention relates to a method for controlling a colour calibration target to be used during a digital printing process, that is, for determining whether the calibration target has been printed correctly and therefore can be successfully used for further operations, in particular for generating a describer of the calibration target, i.e. a file containing information on the calibration target. The describer of the calibration target is intended to be used by a program for creating images.

The invention also relates to a print support, particularly a ceramic tile, on which a calibration target is printed.

The invention is particularly suitable to be used in the field of printing ceramic items, particularly tiles. However, the invention can also be used in other fields, for example, in the field of printing on paper or on fabrics.

International patent application WO 2007/135544 discloses a method for generating images to be printed, in which the colours of each image to be printed are obtained by processing the colours of a previously prepared calibration target. The calibration target disclosed in WO 2007/135544 is herein defined as "palette". The palette is formed by a slab-shaped element on which a plurality of different coloured zones is printed, said coloured zones being called "patches".

In order that the method disclosed in international patent application WO 2007/135544 may produce good quality results, the coloured zones of the palette must be printed correctly, which can be difficult to obtain in the digital printing of ceramic tiles.

For the digital printing of ceramic tiles, a plurality of print bars is normally used, under which the tile to be decorated is passed. The print bars are arranged in a stationary position and each of them comprises a plurality of printheads, for example of the ink-jet type, combined according to different possible arrangements so as to guarantee that the whole width of the tile can be decorated. All the printheads of each bar are configured for applying the same ink to the tiles.

Each print bar applies to the tile a respective ink, which is usually different from the inks applied by the other print bars. From the combination of the inks applied by each print bar, the desired image is defined on the tile.

An example of a printing device for the digital printing of ceramic tiles is disclosed in international patent application WO 00/21760, in the name of Tomas Claramonte.

Despite the printheads of a same bar being supplied with the same ink, it can occur that the heads of the same bar provide print results that differ between one head and another. This can be due to ink supply difficulties, different wear on the heads, different working tolerances in the mechanical parts of the heads, incorrect electronic control of one or more heads, or many other factors.

Whatever be the cause, if the printheads of the same bar print with lack of uniformity between each other, when the colour palette is printed, coloured zones are obtained having colours that do not correspond to the expected ink percentages. For example, if one of the printheads of the bar working with the yellow ink applies smaller quantities of ink than those that it should theoretically apply, the coloured zones in whose composition the yellow ink applied by that printhead falls, will in practice have a different colour from the one they should have. This determines numerous disadvantages in the generation of the images to be printed, which could have a different appearance from that desired by the operator.

US 2009/0015616 discloses an apparatus for controlling a liquid ejection mechanism, the mechanism having a plurality of nozzles for ejecting liquid, particularly ink. For each ink colour, at least two rows of nozzles are provided, which apply ink of that particular colour. The apparatus enables the usage ratio of each nozzle to be determined, on the basis of parameters such as the nozzle temperature. If it is detected that the temperature of a nozzle in a row is high, the apparatus decides to apply a certain colour by using a nozzle of the other row.

US 2009/0015616 teaches to print a plurality of test patterns for a given colour, by using different usage ratios of the nozzles which apply that colour. Measures of the test patterns are then used to correct possible non-uniformity defects between the nozzles which apply each colour, for a given usage ratio.

Although US 2009/0015616 aims at improving printing uniformity between nozzles applying the same colour, US 2009/0015616 does not contain any indication concerning actual control of the resulting print. In particular, US 2009/0015616 does not contain any information which may help a skilled person in determining whether a calibration target has been correctly printed and can be successfully used for subsequent operations.

US 2009/0034001 relates to a device comprising a first reading unit for reading a first side of an original and a second reading unit for reading a second side of the original.

US 2009/0034001 teaches to use grey charts or colour charts to correct a first side reading and a second side reading carried out respectively by the first reading unit and the second reading unit. By so doing, it is possible to affect the colour difference between the first side and the second side in the case of a monochromatic image, or the difference in brightness between the first side and the second side in the case of a coloured image.

US 2009/0034001 uses grey charts or colour charts previously prepared by suitable printing devices. The quality of such charts is never controlled in the method disclosed in US 2009/0034001.

EP 1272574 discloses an ink composition that can be used for decorating ceramic tiles by means of ink-jet techniques. EP 1272574 does not mention calibration targets, since it merely teaches how to print decorative images on the ceramic tiles.

An object of the invention is to improve printing of calibration targets and, consequently, to improve the results of the printing processes which use the above mentioned calibration targets.

A further object is to enable an operator to check if a calibration target has been printed correctly and can be successfully used for subsequent operations, for example to generate a describer of the target.

Another object is to promptly identify any lack of uniformity in the operation of the printheads of a digital printing device or any defects of a print support on which the calibration target is printed.

In a first aspect of the invention, there is provided a method comprising the step of printing a calibration target with a printing device, said printing device comprising a plurality of groups of printheads, the printheads of the same group being fed with ink of the same colour, the calibration target comprising a plurality of coloured zones suitable for being subsequently processed, the method further comprising the steps of:

generating a series of control zones printed by the printheads of the same group with the same nominal quantity of the corresponding ink, the control zones being free of overlapping between inks applied by different printheads;
measuring a parameter of each control zone;
comparing the measured values of said parameter to assess whether the control zones exhibit print anomalies, in order to determine whether the calibration target has been correctly printed;
if no print anomalies are present, processing at least one measurement of each coloured zone to obtain a describer of the calibration target or a colour profile of the printing device.

The method according to the first aspect of the invention uses the control zones, and the measurements thereof, to determine whether the calibration target has been correctly printed and can therefore be used with good results for subsequent operations. The method according to the first aspect of the invention assesses whether the control zones exhibit print anomalies and—if no print anomalies are present—it considers that also the coloured zones have been correctly printed. In this case, measures of the coloured zones can be processed for managing the printing process, obtaining a describer of the calibration target or a colour profile of the printing device.

In a second aspect of the invention, there is provided a method comprising the step of printing a calibration target with a printing device, said printing device comprising a plurality of groups of printheads, the printheads of the same group being fed with ink of the same colour, the calibration target comprising a plurality of coloured zones suitable for being subsequently processed, the method further comprising the steps of:
generating a series of control zones printed by the printheads of the same group with the same nominal quantity of the corresponding ink, the control zones being free of overlapping between inks applied by different printheads;
measuring a parameter of each control zone;
comparing the measured values of said parameter for assessing whether the control zones exhibit print anomalies.

By comparing the values of the selected parameter for the control zones of a series, i.e. for the control zones printed by the printheads belonging to the same group and therefore applying the same ink, it is possible to determine whether such printheads provide uniform print results between each other or not.

There are many reasons why different printheads can provide non-uniform print results.

These reasons can be connected, for example, to non-uniform behaviour between one printhead and another, or to non-uniform behaviour of the nozzles of each printhead, or even to defects in the print support on which the control zones are printed, such as, for example, inclusions, spots, drops or lines.

Should the method according to the second aspect of the invention reveal print anomalies in the control zones, it is possible to decide not to process the calibration target any further, hence avoiding subsequent operations that would not lead to the desired result.

For example, the calibration target can be used to obtain a describer of the calibration target. The describer can be defined as a file in which, for each coloured zone, information is initially stored such as the composition or recipe of inks needed to produce that particular coloured zone. After measuring the coloured zones of the calibration target, it is possible to complete the describer by adding, for each coloured zone, also the relative colour measurement. The describer of the calibration target thus obtained is then used to obtain images to be printed.

In the event that the control zones have any print anomalies, it is possible to decide not to process any further the data relative to the coloured zones of the calibration target. In particular, it may be decided not to complete the describer of the calibration target with the colour measurements of the coloured zones.

Hence, it is possible to avoid obtaining a describer in which the measurements of some coloured zones could be distorted, which would produce errors in printing the colours of the images.

In one embodiment, the coloured zones suitable for being subsequently processed, particularly to generate the target describer, and the control zones, are printed on the same print support.

In this way, the relative position between the coloured zones and the control zones is univocally determined. Consequently, in the event that any lack of print uniformity is detected, it is possible to accurately trace the printhead that emits ink incoherently with the other printheads.

Furthermore, by using a single print support it is certain that both the coloured zones and the control zones have been produced under the same print conditions, that is, with the same operating conditions of the printing device, the same ink characteristics and the same type of print support. This situation may not arise if the coloured zones and the control zones were printed on separate print supports, possibly at different times.

In one embodiment, the method according to the invention is used in a printing process on ceramic items.

By using the method according to the invention in this way, it is possible to substantially improve the print quality of the ceramic items. Due to the relatively high number of printheads configured to apply ink of the same colour, which are used in the ceramic industry, it frequently occurs that lack of uniformity in print results occurs between one head and another. This situation can be recognised by the method according to the invention and subsequently corrected.

In one embodiment, the control zones and the coloured zones are printed on a ceramic tile.

In one embodiment, the ceramic tile is fired before measuring the parameter of each control zone of a series.

In this way, it is possible to analyse the effects of firing on the inks applied by the printheads. This allows the effects of firing to be considered in the subsequent processing of the coloured zones of the calibration target.

The printheads of the same group can be assembled on a print bar so as to define a maximum print extension along a longitudinal dimension of the bar.

In one embodiment, the control zones of a series, i.e. the control zones printed with ink of the same colour and with the same nominal ink quantity, form a composition that has the same linear dimension as said maximum print extension.

The aforementioned linear dimension can be measured transversely to an advancement direction of the print support with respect to the printheads.

In particular, the control zones of a series can be placed alongside each other so as to form a control stripe.

The control stripe can have the same length as said maximum print extension.

In this way, all the printheads of a print bar can print at least one control zone in the composition of control zones, which allows the print uniformity to be checked between all the printheads of a bar.

In one embodiment, a plurality of control stripes is provided, each control stripe being formed by control zones printed with the same ink.

In one embodiment, each printhead of a group produces at least a first control zone and a second control zone, the first control zone being printed with a pre-set nominal ink quantity that is equal for all the printheads of said group and the second control zone being printed with a further pre-set nominal ink quantity which is equal for all the printheads of said group.

The first control zones printed by the printheads of a group define a first series of control zones, whereas the second control zones printed by the printheads of that group define a second series of control zones.

Owing to the first control zones and the second control zones, it is possible to check whether the printheads are printing uniformly for different nominal ink quantity values, i.e. for different values that the ink quantity should have if the corresponding printhead was working properly. Hence it is possible to identify any lack of print uniformity between the different printheads that apply ink of the same colour, even in the event that such lack of uniformity only occurs in certain applied ink quantity conditions, for example with low ink quantities.

In one embodiment, the first control zones printed by the printheads of one same group are arranged along a stripe, the second control zones printed by the printheads of said group being arranged along another stripe.

In this way, the control zones printed with ink of the same colour, but having different nominal ink quantities, can be grouped together in a compact calibration target zone and then measured and evaluated simply.

In one embodiment, the step of measuring a parameter of each control zone comprises measuring a parameter selected, for example, between: optical density of the control zones, colour of the control zones.

The optical density and the colour are two examples of control zone parameters that can be measured relatively easily, providing at the same time reliable results with regard to the uniformity of the control zones printed with ink of the same colour.

In one embodiment, the step of assessing comprises determining whether said parameter has a value comprised between a minimum pre-set value and a maximum pre-set value.

This makes it possible to check if there are any anomalies in the appearance of each control zone.

In one embodiment, if no print anomalies are detected in the control zones, there is provided a step of processing at least one measurement of each coloured zone so as to update a describer of a calibration target.

The describer can then be used by a program for generating images to be printed.

The describer of the calibration target is then updated only if the print result is uniform for all the control zones, so as to be certain that the image that will be generated using the describer is as close as possible to the operator's expectations.

In one embodiment, if print anomalies emerge in the control zones, the step of generating a message or a warning signal is provided, so that it is possible to decide whether to intervene in the printing process.

In this way, it is possible to avoid generating describers of calibration targets that may not guarantee good print results due to an incorrectly printed calibration target.

In a third aspect of the invention, a print support is provided, particularly a ceramic tile, comprising a surface on which a plurality of coloured zones is printed defining a calibration target, the calibration target having a pre-set width, wherein on said surface a plurality of series of control zones is further printed, the control zones of the same series being printed with ink of the same colour, each series extending in a region of the tile having the same linear dimension as said pre-set width.

The print support according to the third aspect of the invention can be used in a method according to the first or second aspect of the invention to check if a digital printing process provides print anomalies.

The invention can be better understood and implemented with reference to the attached drawings, which illustrate some exemplary and non-limiting embodiments, in which:

FIG. 1 shows a printing device 1 for printing an image on a ceramic item, particularly a tile 2, through digital printing techniques.

Figure 1:
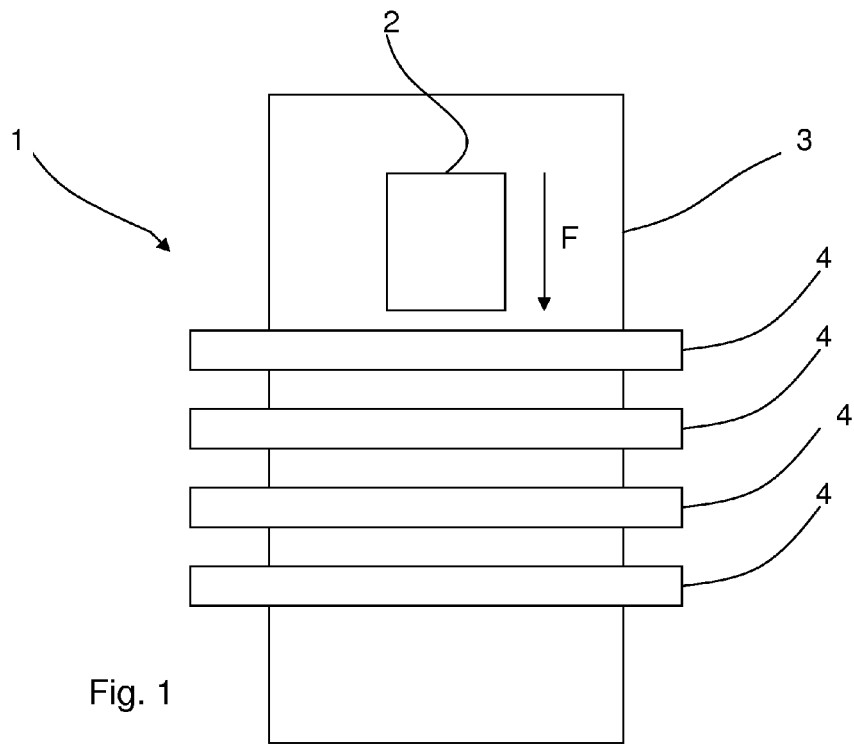
FIG. 1 is a schematic view, from above, of a device for the digital printing of ceramic items.

The printing device 1 comprises a plurality of print groups, each of which is predisposed for applying to the tile 2 an ink having a pre-set colour. Each print group can extend along a main extension direction, hence being conformed like a print bar 4.

A conveyor 3 is provided, for example of a belt type, suitable for advancing the tile 2 along an advancement direction F.

The print bars 4 are positioned above the conveyor 3 and extend in a transverse direction, particularly perpendicular, with respect to the advancement direction F. The print bars 4 are arranged in sequence along the advancement direction F.

Each print group or bar 4 comprises a plurality of printheads 5, each of which is adapted to apply, if desired, drops of ink on the tile 2. The printheads 5 can be of the ink jet type and can each comprise a plurality of nozzles suitable for dispensing drops of ink. The printheads 5 are arranged in sequence along the print bar 4 according to different possible arrangements, so as to define a maximum print extension along a longitudinal dimension of the bar. This maximum printing extension corresponds to the maximum width of tile 2 which can be decorated, measured perpendicularly to the advancement direction F.

Figure 2:
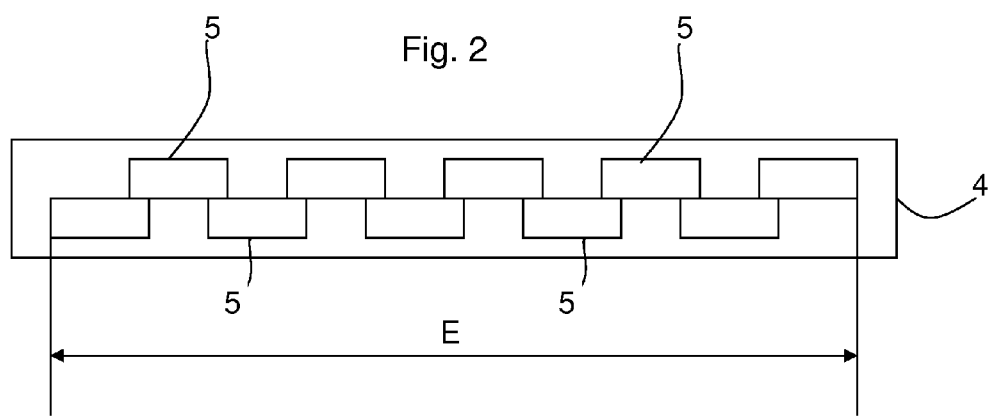
FIG. 2 is a schematic enlarged view, from below, of a print bar of the device of FIG. 1.

FIG. 2 shows, from below, a possible arrangement of the printheads 5, inside a print bar 4. In the example of FIG. 2, the printheads 5 are arranged along a line which is perpendicular to the advancement direction F, alternatively one further ahead and one further behind relative to the advancement direction F. The maximum print extension defined by the printheads 5 is indicated with E.

The printheads 5 can however also be positioned according to many other arrangements. For example, the printheads 5 could be assembled in the print bar 4 so as to be inclined with respect to the advancement direction F.

The method that will be described below is applicable whatever the arrangement of the printheads 5 in the print group or bar 4.

The printheads 5 belonging to a same print group or bar 4 are configured so as to apply ink of the same colour on tile 2. For that purpose, the printheads of a print bar 4 can be connected to a single ink tank.

On the other hand, the print bars 4 can apply inks whose colours differ between one print bar and another. In the example of FIG. 1, a printing device 1 is shown, which can operate according to the four-colour process technique. In this case, four print bars 4 are provided, arranged in sequence along the advancement direction F, configured so that each print bar 4 applies an ink used in the four-colour process, that is, yellow, cyan, magenta and black. However, it is also possible to use a different number of print bars from four. For example, it is possible to use only three print bars, should the printing device 1 work according to different techniques from the four-colour process. Alternatively, it is possible to provide particularly sophisticated printing devices that comprise more than four print bars, for example, up to eight print bars. In this case, it may happen that two print bars apply ink of the same colour.

During operation, the tile 2 is advanced along the advancement direction F by the conveyor 3, so as to pass, in sequence, under the print bars 4. According to the image to be printed on the tile 2, pre-set printheads 5 of the print bars 4 are activated. The printheads 5 thus activated apply to the tile 2 drops of ink in pre-set positions and in nominal pre-set quantities, producing the desired image.

Figure 3:
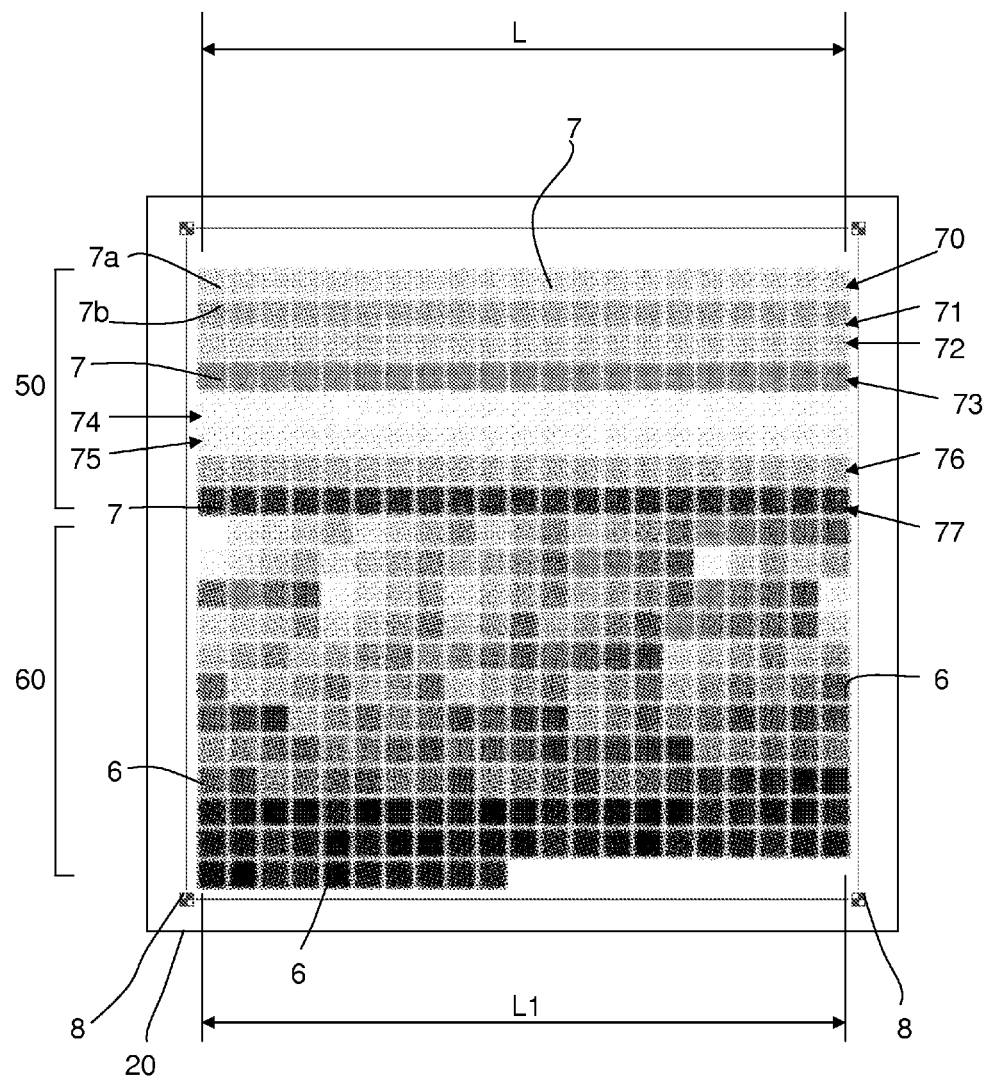
FIG. 3 is a view of a print support on which a calibration target is printed.

FIG. 3 shows a calibration target that can be used to acquire information on the colours that the printing device 1 can effectively print, in order to generate, starting from any theoretical image chosen by an operator, an image that can actually be printed on the tile 2. The calibration target shown in FIG. 2 can also be called "palette".

The calibration target comprises a plurality of coloured zones 6, having for example a square or rectangular shape. Each coloured zone 6 corresponds to a pre-set combination of inks that the printing device 1 can print, that is, to a pre-set recipe, printed with a pre-set print density or quantity of ink. The number of coloured zones 6 of the calibration target can be chosen as preferred, by varying the number of ink combinations and/or print densities used in order to obtain the calibration target. For example, if the printing device 1 uses four inks and six print densities (0, 20, 40, 60, 80 e 100%) are taken into consideration, it is possible to obtain a calibration target comprising 1296 coloured zones 6.

The dimensions of the coloured zones 6 can also be chosen as preferred. For example, each coloured zone 6 can be conformed like a 5 mm sided square, but it is also possible to use smaller coloured zones, for example having dimensions in the order of 1 mm×1 mm, or larger coloured zones, for example, having dimensions in the order of 10 mm×10 mm.

In general, the number of coloured zones 6, is chosen so as to ensure a closely concentrated sample of the gamut of the printing device 1. By reducing the dimensions of the coloured zones 6, it is possible, for a given calibration target, to maximise the number of coloured zones 6 that form the calibration target and that can therefore be processed to generate a describer of a calibration target, as will be described better below. This enables an improvement in the print quality.

Further information on the coloured zones 6 of the calibration target is contained in the international patent application WO 2007/135544.

The coloured zones 6 are printed on a surface of a print support which, in the example shown, is a reference tile 20, made of ceramic material.

As shown in FIG. 3, the print support on which the calibration target is printed, that is, the reference tile 20, is also provided with a plurality of control zones 7 which make it possible to check whether the printheads 5 of the printing device 1 produce uniform print results or whether there are print anomalies. In the following description, by way of example, reference will be made to control zones 7 which make it possible to check whether the printheads 5 apply the relative ink uniformly, or whether there is lack of uniformity between one printhead and another. However, it is possible, as will be described later, to use the control zones 7 to check whether there are other anomalies that could invalidate the subsequent processing of the calibration target.

In the example shown, each control zone 7 is shaped like a square, but the control zones 7 may also have a rectangular shape or more generally any other shape.

The dimensions of the control zones 7 may be chosen as preferred, depending on the dimensions of the reference tile 20 and/or depending on the desired number of control zones 7. For example, the control zones 7 can have dimensions of 5 mm×5 mm, but may also have smaller dimensions, in the order of 1 mm×1 mm, or larger dimensions, in the order of 10 mm×10 mm.

In the example shown, the control zones 7 have the same shape and the same dimensions as the coloured zones 6, but this condition is not essential. The control zones 7 can, in fact, also have different shapes and/or dimensions from the shapes and/or dimensions of the coloured zones 6.

Each control zone 7 is printed by a single printhead 5 and is therefore obtained with a single ink. In other words, the control zones 7 are generated without overlapping inks applied by printheads 5 that are different from each other.

Each printhead 5 is able to apply different nominal quantities, freely selectable by the user, of the corresponding ink. The nominal quantity of ink that each printhead 5 can apply is indicated by a percentage value and is commonly also called print density. For example, when a printhead works so as to apply the maximum quantity of ink that the head can emit, it is said that the print density is 100%. If the printhead is programmed so as to apply half the maximum quantity of ink that the printhead can emit, it is said that the print density is 50%.

Hence, we talk about a "nominal" ink quantity to indicate the quantity of ink that the corresponding printhead 5 is theoretically able to apply. However, it can happen that, for many reasons, the ink quantity that a printhead effectively applies is different from the nominal quantity selected. This can cause lack of uniformity problems between different printheads.

The control zones 7 printed with the same nominal ink quantity by printheads 5 belonging to the same print bar 4 define a series of control zones.

In the example shown, the control zones 7 printed by printheads 5 programmed to apply the same ink, for the same nominal ink quantity applied, are grouped together so as to form a control stripe on the reference tile 20.

It is possible to ensure that the same printhead 5 prints on the reference tile 20 a plurality of control zones 7, all having the same nominal ink quantity. A printhead 5 is usually able to apply ink in a chosen position along a line having a length of a few centimeters, that is, able to cover a print zone of the length of a few centimeters. By selecting control zones 7 having dimensions in the order of a few millimeters, it follows that each printhead 5 can print a plurality of control zones 7, next to each other. This makes it possible to test, as well as the print uniformity between different printheads 5, also the print uniformity of a single printhead in different printing positions.

In some conditions, it may however be sufficient for one printhead 5 to print a single control zone 7 in one control stripe.

It is also possible to evaluate any lack of print uniformity between printheads 5 that apply the same ink for different nominal ink quantity values applied by each printhead 5.

In the example shown, control zones 7 have been provided for each ink, printed for two distinctive nominal ink quantity values. The nominal ink quantity values investigated are 100% and 50%. Therefore, each printhead 5 prints on the reference tile 20 at least a first control zone 7a by applying half the maximum ink quantity that the printhead can apply and at least a second control zone 7b by applying the maximum ink quantity that the printhead can apply.

The control zones that were printed with the same nominal ink quantity of the same colour can be grouped together to form a control stripe. In the example shown, for each ink colour, there will hence be a first control stripe comprising the first control zones 7a and a second control stripe comprising the second control zones 7b.

By printing control zones with different nominal ink quantity values, it is possible to check whether the printheads 5 configured to apply the same ink are printing uniformly for different nominal ink quantity values. It has been verified experimentally that inks of certain colours, particularly with high ink quantity values, tend to spread on the surface to which they are applied, hence masking, within a certain limit, possible print differences between two printheads 5. By providing control zones for different nominal ink quantity values, it is therefore easier to identify lack of uniformity in behaviour between the printheads 5 that apply the same ink.

The stripes printed with ink of the same colour that refer to different nominal ink quantity values can be adjacent to each other.

In the example shown, on the reference tile 20 a plurality of control stripes is printed according to the arrangement described below. Near an edge of the reference tile 20, a control stripe 70 is provided, comprising a plurality of cyan control zones with a nominal ink quantity of 50% of the ink that the printheads 5 dispensing cyan ink can apply. Immediately below the control stripe 70, a further control stripe 71 is provided comprising a plurality of control zones, also cyan, but printed with 100% of the ink that the printheads 5 dispensing cyan ink can apply.

Two control stripes 72 and 73 are also provided, comprising magenta control zones, obtained by applying nominal ink quantities of 50% and 100% respectively.

Moving towards the centre of the reference tile 20, two control stripes 74 and 75 can be found, comprising yellow control zones, with 50% and 100% respectively of the ink quantity theoretically applicable by the respective printheads.

Finally, on the reference tile 20, two control stripes 76 and 77 can be found, comprising black control zones, again with 50% and 100% of the nominal ink quantity applicable by the respective printheads.

In general, for each ink, it is possible to provide control zones printed with an arbitrary number of nominal ink quantity values. For example, it would be possible to print control zones with a single nominal ink quantity value for each ink of a pre-set colour. Alternatively, it may be possible to print, for each ink, three control zones each having a different nominal ink quantity value, for example, 30%, 60% and 90%. The number and type of ink quantity or print density to be investigated can be chosen freely according to many factors, such as the type of inks, the characteristics of the tiles to be decorated and the type of image to be printed.

Each control stripe or, more generally, each series of control zones 7, has a length L which is substantially the same as the maximum print extension E that can be printed by a print bar 4. In this way, it is possible to analyse all the printheads 5 of the same print bar 4.

The length L is substantially the same as the width L1 of the calibration target, that is, the linear dimension of the calibration target measured perpendicularly to the advancement direction F.

It is also possible to arrange the control zones 7 printed with the same ink and the same ink quantity in compositions of different shapes from a stripe. In general, each of the aforementioned compositions can have a linear dimension, measured transversely to the advancement direction F, equal to the maximum print extension E that can be printed by a print bar 4.

The control stripes printed with inks of different colours can be grouped together in a first region 50 of the reference tile 20, which in the example shown is an upper region of the reference tile 20. This makes it simpler to measure the control zones 7. Similarly, the coloured zones 6 can be grouped together in a second region 60 of the reference tile 20. The first region 50 and the second region 60 do not overlap with each other.

On the reference tile 20 there may also be reference signs 8, which will not be described in detail since they are of the known type.

Figure 4:
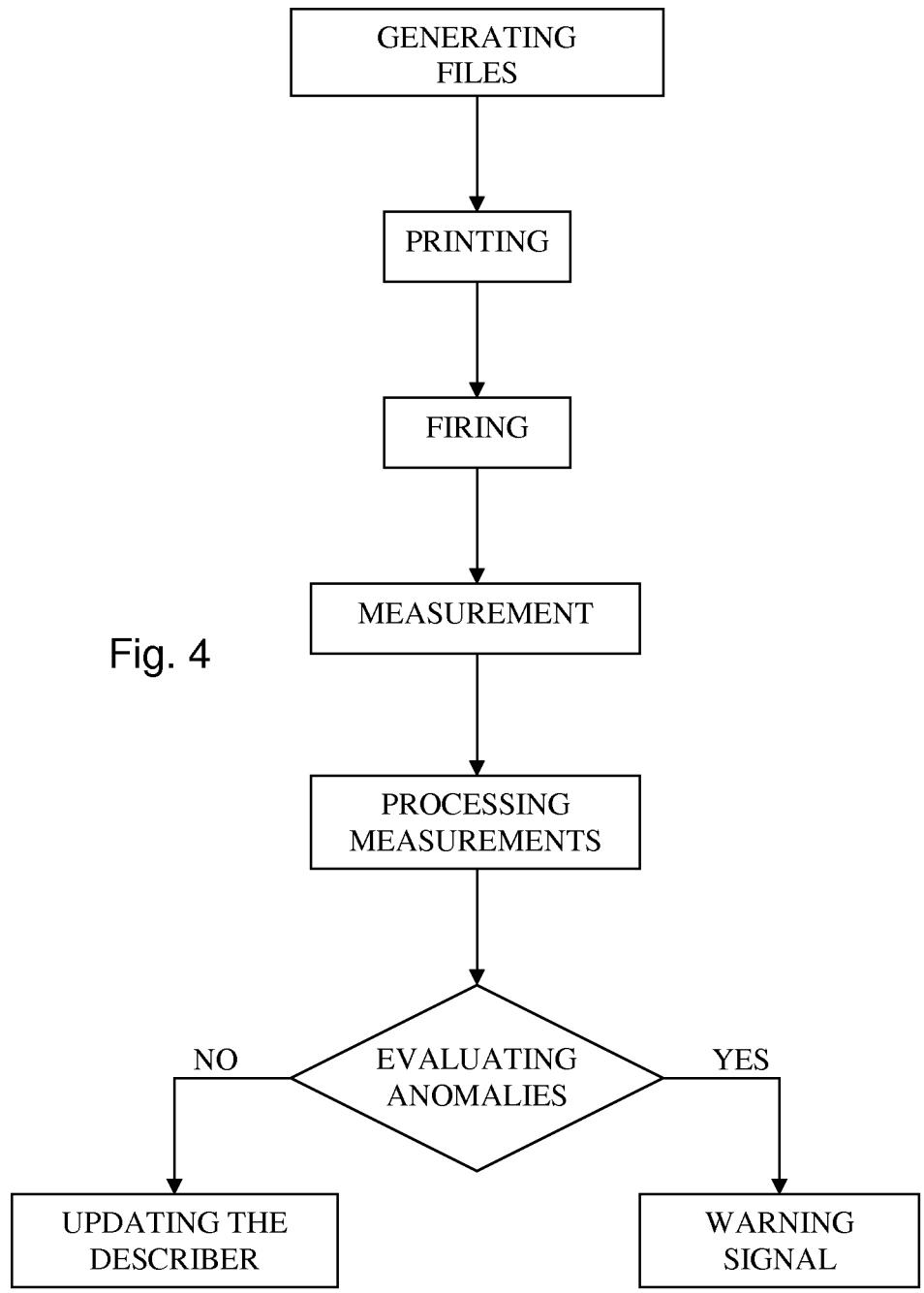
FIG. 4 is a flow diagram relative to a method that makes it possible to check if a calibration target is correctly printed.

FIG. 4 shows a flow diagram relative to a method using the reference tile 20.

In the example shown, the method starts with a step of generating files needed for printing the coloured zones 6 and the control zones 7 on the reference tile 20. These files can comprise a first file that contains, for each coloured zone 6 and for each control zone 7, the "recipe" of the coloured zone 6 or the control zone 7, i.e. the composition expressed as a percentage of the different inks applied by the printing device 1 (in the example shown, cyan, magenta, yellow and black) to obtain the corresponding coloured zone 6 or control zone 7, along with the nominal ink quantity or print density. The first file also contains information on the layout, that is, the reciprocal position, of the coloured zones 6 and the control zones 7. The first file obtained in this step of the method can be called the incomplete describer of the calibration target.

A second file is also created, which is a printable image, that can be read from the printing device 1.

The step of generating files described above is not an essential step, that is, it is not necessarily envisaged every time the method is applied. Once the first file and the second file mentioned above have been generated, they can be used a number of times for different printing processes.

Following the step of generating files which, as already mentioned, can be absent, there is provided a step of printing the coloured zones 6 and the control zones 7 on a surface of a print support, for example on a reference tile 20, made of ceramic material.

The printing step is carried out by the same printing device 1 that will be subsequently used to decorate the tiles 2. During the printing step, it is possible to use ceramic inks, that is, inks containing pigments suitable for being fired at the temperatures normally reached by tiles in ceramic kilns.

The reference tile 20 has a body made of the same ceramic material that will be subsequently used for the tiles 2 to be decorated. This makes it possible to evaluate also the effects of the colour of the body of the tile on the appearance of the printed inks.

At this point, the method comprises a firing step, during which the reference tile 20, on which the control zones 7 and the coloured zones 6 were printed, is fired in a kiln at the usual firing temperatures for ceramic tiles, for example, between 900 and 1350° C. according to the ceramic material used to make the body of the tile. It is hence possible to evaluate the effects of the firing on the appearance of the printed inks.

The firing step can be absent whenever the method according to the invention is used in a printing process of non-ceramic items, which are not intended to be fired, for example, paper, fabrics or ceramic items intended to be decorated with inks in a cold process, that is, inks that do not require firing. In this case, since the print support on which the coloured zones 6 and the control zones 7 are printed, is made with the same material with which the items to be printed are made, not even the print support needs to be fired.

After the possible firing step, a measurement step is provided during which at least one parameter of the control zones 7 is measured.

In the example that we are describing the parameter that is measured is suitable for providing indications on the uniformity of the control zones 7 printed with the same ink and the same nominal ink quantity, and therefore also for evaluating whether the printheads 5 that apply that colour are working uniformly For example, the parameter that is measured can be the optical density, or the colour. More generally, it is possible to measure any parameter that allows significant indications to be obtained on the operating uniformity of the printheads 5 of the same print group 4.

The measurement step is performed using an instrument that is selected according to the type of parameter to be measured. For example, for measuring the optical density of the control zones 7, it is possible to use a densitometer. If it is desired to measure the colour of the control zones 7, it is possible to use a spectrometer, a spectrophotometer, an RGB scanner, an RGB video camera or a spectral scanner.

During the measurement step for measuring the control zones 7, it is also possible to acquire a measurement of the coloured zones 6. This is particularly convenient when the coloured zones 6 are measured with the same instrument used to measure the control zones 7, for example a spectrometer, a spectrophotometer, an RGB scanner, an RGB video camera or a spectral scanner.

Alternatively, it is possible to acquire the measurements of the coloured zones 6 in a different step, for example after the step in which the control zones 7 are measured. In this case, it is possible to decide to acquire the measurements of the coloured zones 6 only if the control zones 7 have made it possible to ascertain that the printheads 5 are working in sufficiently uniform conditions.

The measurements of the control zones 7 and possibly the coloured zones 6 are stored, for example, in the same file that contains the data used to print the control zones 7 and the coloured zones 6 on the reference tile 20.

After the measurement step, a processing step is provided in which the measurements of the control zones 7 are processed to check whether the control zones 7, and therefore the corresponding printheads 5, fulfil a pre-set uniformity criterion. This step can for example be actuated as described below.

From the measurement step of the control zones 7 it is possible to obtain, for each ink colour and for each nominal ink quantity, n×i values $V_1, V_2, \ldots V_{n \times i}$ of the considered parameter, where n is the number of control zones 7 printed with the same ink and the same nominal quantity of that ink, while i is the number of measurements performed for each control zone 7. It is possible, in fact, within each control zone 7, to define one or more measurement points in which the considered parameter is measured. The values $V_1, V_2, \ldots V_{n \times i}$ can be compared with each other to evaluate whether the printheads 5 that apply the ink of the considered colour, for the same nominal ink quantity, provide uniform print results.

For this purpose, it is possible for example to process the values $V_1, V_2, \ldots V_{n \times i}$ to calculate a mean value $V_m$ of the measured parameter. The values that differ from the mean value $V_m$ for a quantity lower than a pre-set tolerance are considered able to fulfil the uniformity criterion. This means that the printheads 5 that have produced the corresponding control zones 7 work in uniform conditions with each other. If, on the other hand, a particular value $V_x$ differs from the mean value $V_m$ by an amount greater than the pre-set tolerance, the uniformity criterion for the printhead 5 that printed the control zone 7 having the value $V_x$ is not fulfilled. Consequently, that printhead does not work uniformly enough with respect to the other printheads that apply inks of the same colour.

In other words, the uniformity criterion is considered fulfilled for the printheads 5 that have printed a control zone 7 whose measured parameter falls within a range defined by $V_m \pm \Delta T$, where $\Delta T$ is the pre-set tolerance, that could be different for each ink.

The uniformity criterion is checked for all the control zones 7 printed with ink of the same colour, for all the nominal ink quantities investigated and for all the ink colours printed by the print bars 4.

If the uniformity criterion is considered globally fulfilled, that is, fulfilled for all the printheads 5 with each nominal ink quantity investigated, it is possible to continue processing the data deriving from the measurement of the calibration target, that is, the data contained in the describer, relative to the coloured zones 6. If the coloured zones 6 have not been measured together with the control zones 7, the measurement of the coloured zones 6 can be performed at this point, that is, after the uniformity criterion is considered to have been fulfilled.

If, on the other hand, one or more printheads 5, for one or more nominal ink quantity values considered, does not fulfil the uniformity criterion, it is then possible to generate a message or a warning signal to allow the operator to intervene in the printing process. Owing to the warning signal, the operator is warned that at least one printhead 5 prints with lack of uniformity with respect to the other printheads 5. The operator can at this point decide whether to continue to process the data relative to the coloured zones 6, or to interrupt the printing process. For example, if it is desired to print on tiles 2 of relatively narrow dimensions and the printheads 5 that did not meet the uniformity criterion are in a peripheral zone of the print bars 4, outside the surface of the tiles 2, the printing process can be continued without any difficulty.

In the event that the printing process is continued, because the uniformity criterion is considered fulfilled or because the operator has decided to continue to print regardless of the warning signal, it is possible to process the data relative to the coloured zones 6 according to different methods.

For example, the data relative to the coloured zones 6 could be processed as disclosed in the international patent application WO 2007/135544.

In this case, after measuring the coloured zones 6 printed by the printing device 1, the measurement of each coloured zone 6 is associated with the recipe with which the corresponding coloured zone was printed. Hence, the describer of the calibration target, or palette describer, is completed, thereby obtaining a file that contains a plurality of pairs each comprising a colour measurement, that is, a coloured zone 6, and the corresponding recipe. The colours that appear in the palette describer are only real colours that have been printed by the printing device 1 and then measured.

At this point, starting from an ideal image to be printed, each ideal colour of the ideal image is replaced with the corresponding real colour, i.e. with the colour of a coloured zone 6 that was effectively printed by the printing device 1 and then measured. Alternatively, each ideal colour of the ideal image to be printed can be replaced by a colour whose recipe is calculated through interpolation of close values of pairs of close colour measurement/colour recipe, taken from the palette describer.

Hence a printable image is generated, which can be evaluated to determine whether it is satisfactory and, if so, printed.

Alternatively, the data relative to the coloured zones 6 can be processed according to any known colour management method, in order to generate an image to be printed. In particular, the data relative to the coloured zones 6 can be processed according to any known technique so as to obtain a colour profile of the printing device 1.

In any case, by printing and measuring the control zones 7 it is possible to evaluate whether the printheads 5 provide uniform print results, so as to establish whether the coloured zones 6 are capable of being processed, that is, whether they can be processed successfully to generate a describer of the calibration target.

In the above description, reference was made to control zones 7 which were used to determine whether the printheads 5 applying the same ink were working uniformly with each other. It is however possible to use the control zones 7 also to identify other types of anomalies, for example, to verify whether different nozzles of the same printhead 5 apply the ink in substantially the same way as each other. The control zones 7 can also enable to determine whether one or more nozzles of a printhead 5 are clogged up, in which case a line not covered by ink appears on the print support.

Alternatively, the control zones 7 can be used to determine whether there are defects on the print support, for example, on the reference tile 20. Some examples of defects that can be found on the print support may be:
  inclusions on the print support;
  spots;
  drops of foreign substances that have fallen onto the print support, for example, during the steps of transport.

In an embodiment that is not shown, whenever the uniformity criterion is not fulfilled, or whenever when measuring the control zones 7 other anomalies have been detected, it is possible to use the measured values of the control zones 7 to correct the calibration target, in particular by modifying the measurement of the coloured zones 6. This aims, where possible, to generate a calibration target measurement in which the control zones 7 allow the anomalies detected to be, at least partially, compensated.

Figure 5:
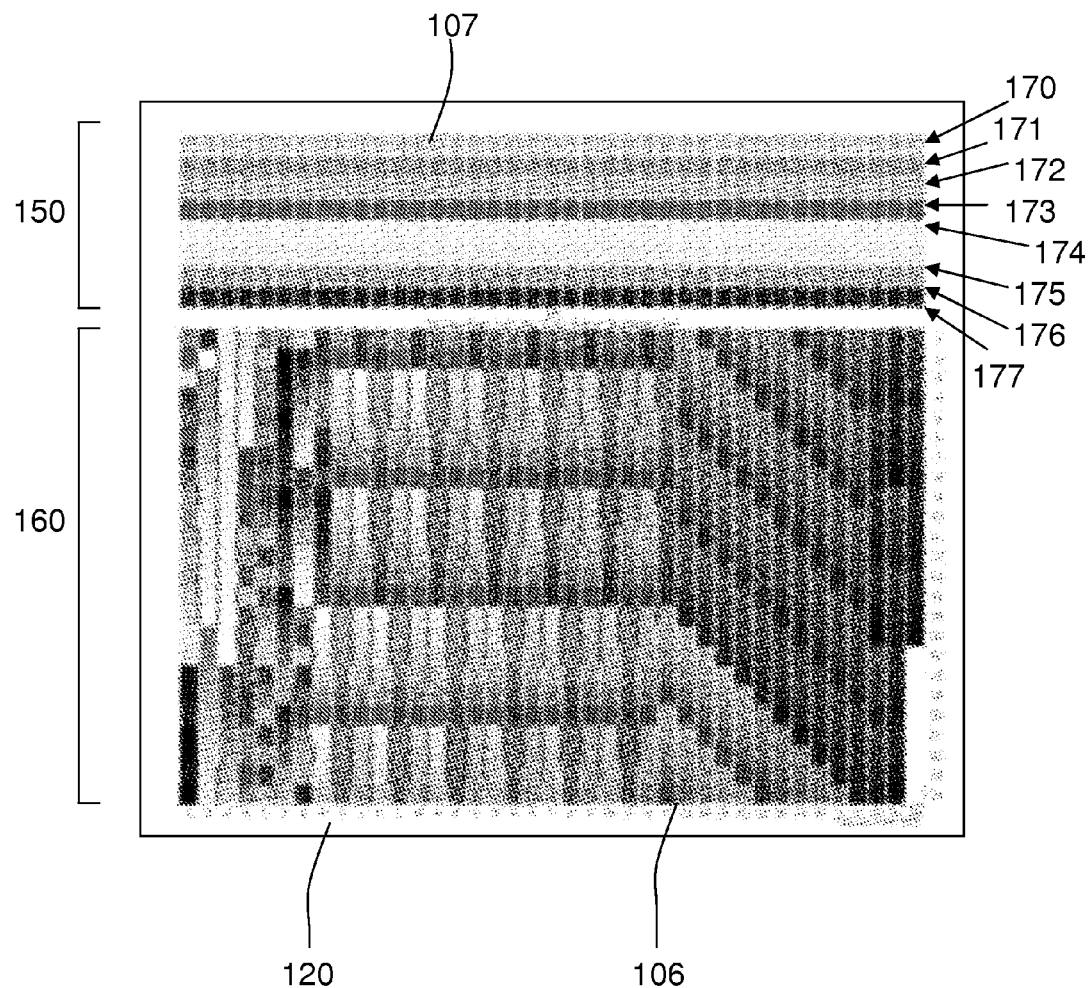
FIG. 5 is a view like the one in FIG. 3, showing a print support according to an alternative embodiment.

FIG. 5 shows a print support 120, for example a ceramic tile, according to an alternative embodiment.

On the print support 120 it is possible to identify a first region 150 in which a plurality of control stripes is grouped together comprising respective control zones 107, similar to the control zones 7 described with reference to FIG. 3. On the print support 120 it is also possible to identify a second region 160 in which a plurality of coloured zones 106 is grouped together defining a calibration target. In the example shown in FIG. 5, the calibration target defined by the coloured zones 106 is a calibration target known as IT8 according to ANSI (American National Standard Institute) standards for the communication of colours and control specifications. This calibration target can be used to generate an ICC profile of the printing device 1.

In the first region 150 of the print support 120 it is possible to identify a first cyan control stripe 170 and a second cyan control stripe 171, obtained with a nominal ink quantity of 50% and 100% respectively of the ink that the printheads 5 dispensing the cyan ink can apply.

Furthermore, two control stripes 172 and 173 are present, both magenta, corresponding to 50% and 100% respectively of the nominal ink quantity.

Below the magenta control stripes, two control stripes 174 and 175 can be noted, both yellow, with 50% and 100% respectively of the ink quantity theoretically applicable by the respective printheads.

Finally, the first region 150 comprises two control stripes 176 and 177, comprising black control zones, again with 50% and 100% of the nominal ink quantity applicable by the respective printheads.

It is to be understood that, also in the example shown in FIG. 5, the control zones printed with the same ink and the same nominal ink quantity could also be arranged according to compositions of a different shape from the stripes.

The print support 120 can be used in the method already disclosed with reference to FIG. 4, so as to evaluate whether there are anomalies in the print results, for example, to determine if the printheads 5 that form a print group 4 are working with lack of uniformity. If no anomalies are detected, the measurements of the coloured zones 106 can be used to generate a colour profile, for example according to the ICC standard, of the printing device 1.

The invention claimed is:

1. A method comprising the steps of:
   (a) providing a printing device comprising a plurality of groups of printheads;
   (b) feeding the printheads of the same group with ink of the same colour;
   (c) printing a calibration target comprising a plurality of coloured zones with the printing device;
   (d) printing a plurality of series of control zones, each series of control zones being printed by the printheads of a group with the same nominal quantity of the corresponding ink, the control zones being free of overlapping between inks applied by different printheads, the coloured zones and the control zones being printed on a single print support, wherein the control zones are distinct from the coloured zones;
   (e) for each control zone, measuring a parameter and obtaining a measured value;
   (f) comparing said measured values and determining whether the control zones fulfill a pre-set uniformity criterion;
   (g) when the control zones fulfill said pre-set uniformity criterion, processing at least one measurement of each coloured zone; and
   (h) providing a describer of the calibration target or a colour profile of the printing device; wherein, when it is determined that a control zone does not fulfill said pre-set uniformity criterion, there is provided a step of using the measured values of said parameter and correcting measures of the calibration target or there is provided a step of generating an attention signal.

2. A method according to claim 1, wherein the control zones of the same series are placed side by side so as to form a control stripe.

3. A method according to claim 2, wherein the printheads of the same group are assembled in a printing bar so as to define a maximum printing extension along a longitudinal dimension of the bar, said series having a linear dimension equal to said maximum printing extension.

4. A method according to claim 1, wherein the printheads of one group generate at least one first series of control zones printed with a preset nominal quantity of ink and a second series of control zones printed with a further preset quantity of ink, said preset nominal quantity being different from said further preset quantity.

5. A method according to claim 4, wherein the control zones are grouped in a region of the print support, said region being free of intersections with a further region of the print support in which the coloured zones are grouped.

6. A method according to claim 4, wherein the print support is a ceramic tile.

7. A method according to claim 6, and further comprising the step of firing the ceramic tile after printing the coloured zones and the control zones and before measuring said parameter.

8. A method according to claim 1, wherein the parameter that is measured is selected from the group consisting of optical density and colour.

9. A method according to claim 1, wherein the describer of the calibration target contains, for each coloured zone, a recipe of inks required for producing said coloured zone.

10. A method according to claim 9, wherein, during said step of processing, the describer of the calibration target is updated by adding, for each coloured zone, the corresponding measurement.

11. A method according to claim 1, wherein the describer of the calibration target is used by a program for generating images to be printed.

12. A method according to claim 11, wherein the describer of the calibration target contains, for each coloured zone, a recipe of inks required for producing said coloured zone, and wherein, during said step of processing, the describer of the calibration target is updated by adding, for each coloured zone, the corresponding measurement, each ideal colour of an ideal image to be printed being replaced by a colour of a coloured zone which was printed and measured, or by a colour having a recipe which is calculated by interpolating pairs of close values of colour measurement/colour recipe, taken from the describer of the calibration target.

13. A method according to claim 1, wherein said colour profile of the printing device is an ICC profile.

14. The method according to claim 11, comprising a further step of printing at least one of said images on a ceramic tile.

* * * * *